Sept. 26, 1939.  W. W. SLOANE  2,174,097
SHAKER CONVEYER
Filed Feb. 11, 1938   3 Sheets-Sheet 1
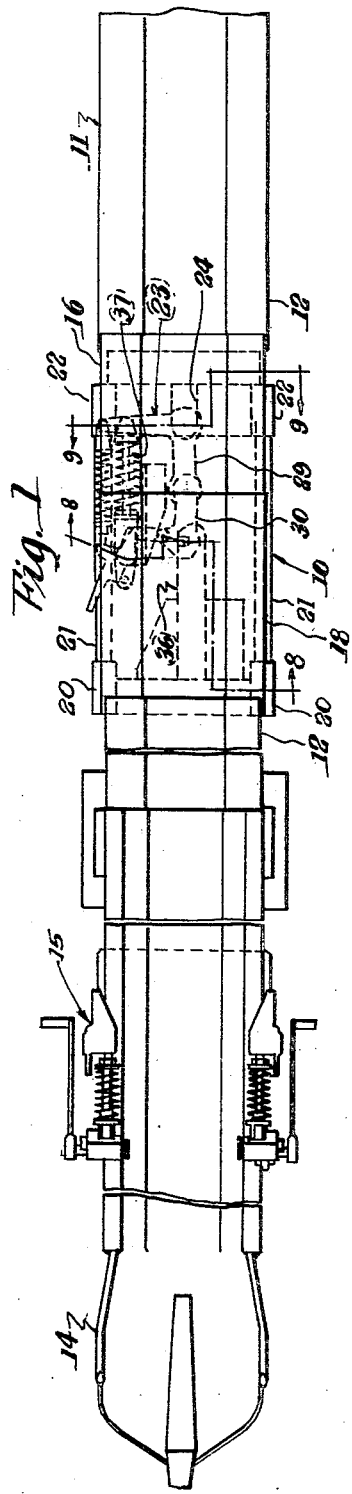
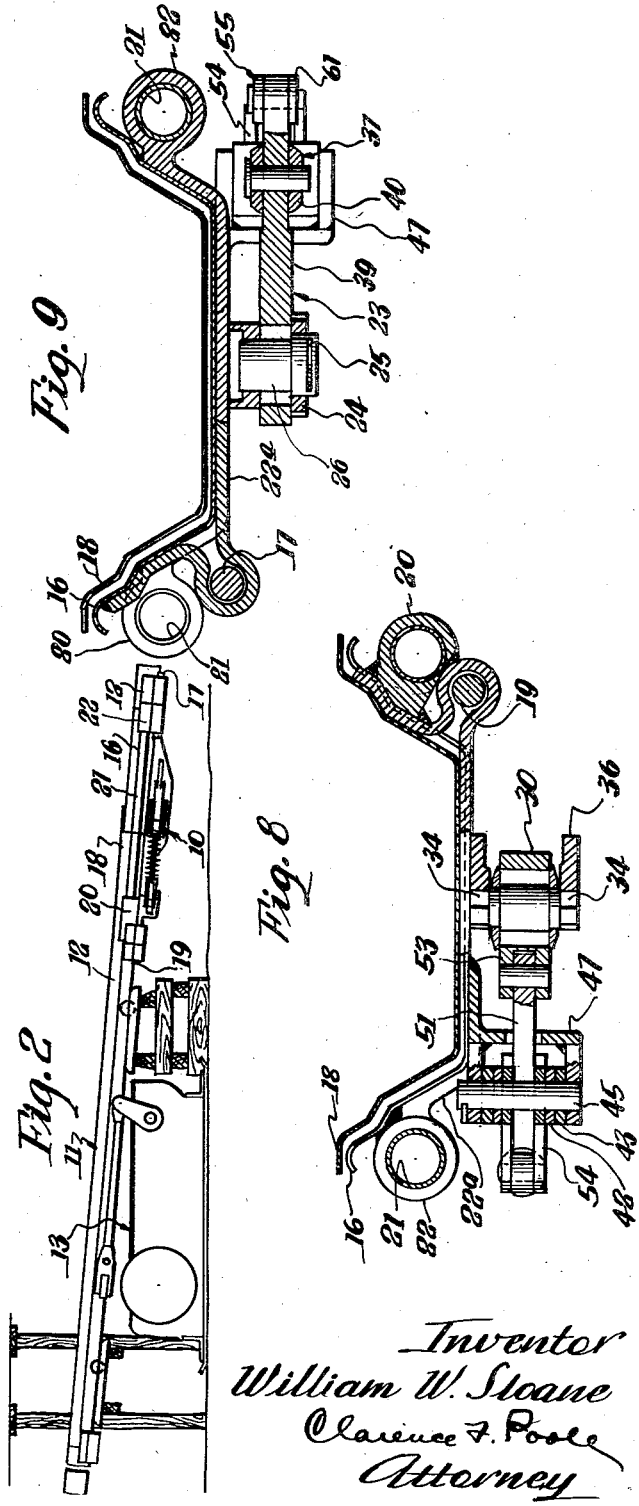
Inventor
William W. Sloane
Clarence F. Poole
Attorney Sept. 26, 1939.　　W. W. SLOANE　　2,174,097
SHAKER CONVEYER
Filed Feb. 11, 1938　　3 Sheets-Sheet 2
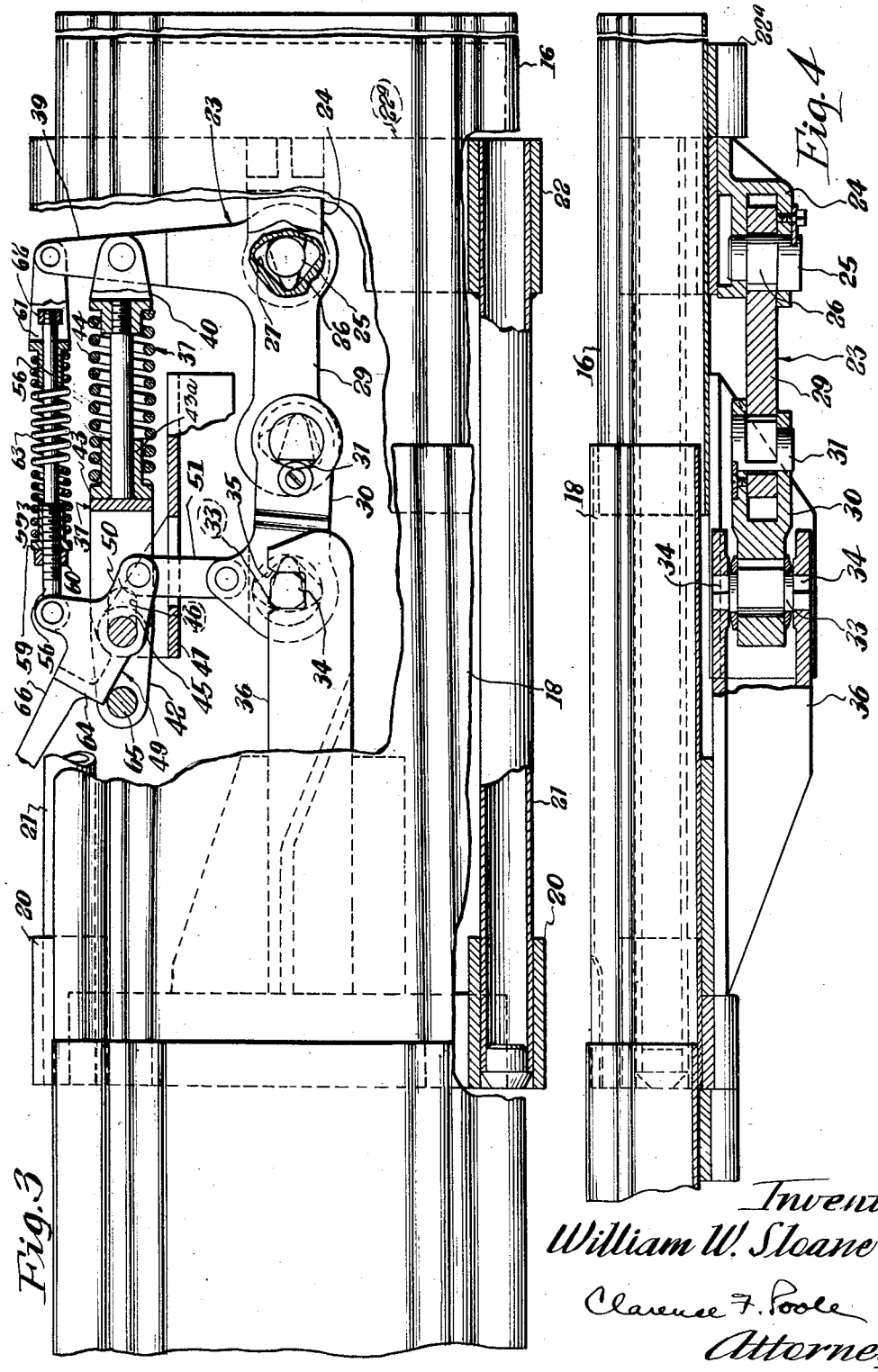

Sept. 26, 1939.  W. W. SLOANE  2,174,097
SHAKER CONVEYER
Filed Feb. 11, 1938   3 Sheets-Sheet 3
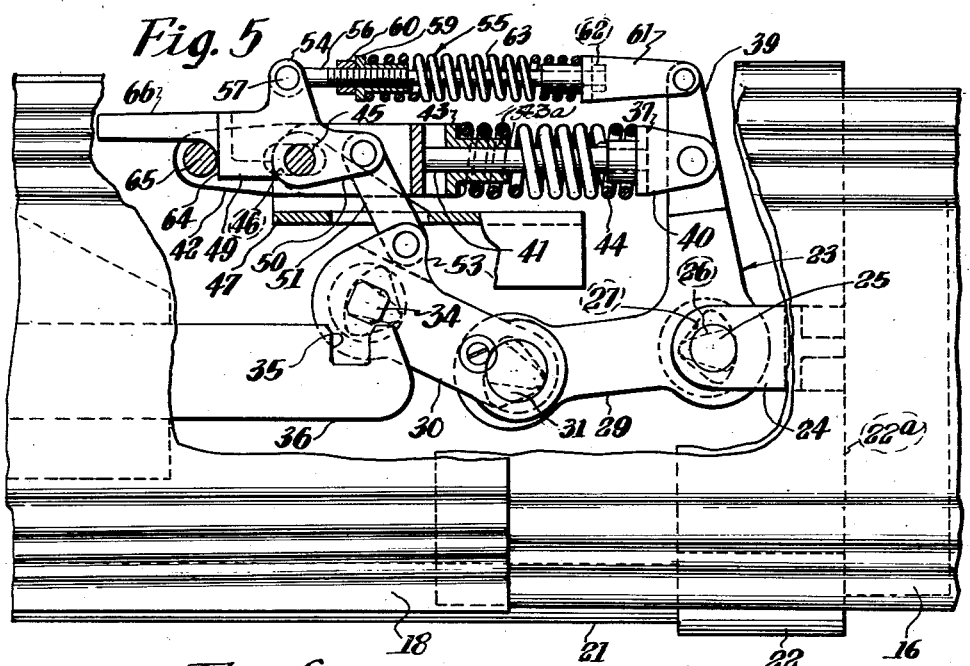
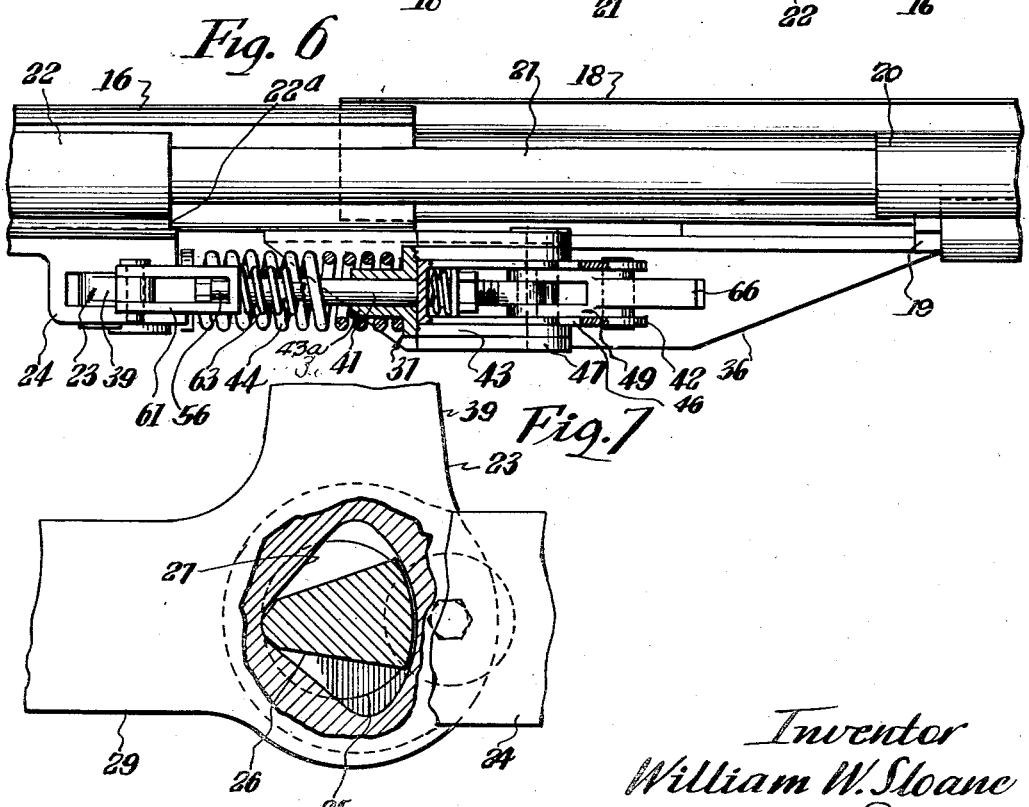
Inventor
William W. Sloane
Clarence F. Poole
Attorney Patented Sept. 26, 1939

2,174,097

UNITED STATES PATENT OFFICE 2,174,097

SHAKER CONVEYER

William W. Sloane, Chicago, Ill., assignor to Goodman Manufacturing Company, Chicago, Ill., a corporation of Illinois Application February 11, 1938, Serial No. 189,915

18 Claims. (Cl. 198—220)

This invention relates to improvements in shaker conveyers of the type adapted to be used in mines underground and more particularly relates to a means for releasing an overload condition from a shaker conveyer trough line.

More specifically, the present invention relates to an overload releasing device somewhat similar to that disclosed in a prior application Serial No. 188,256, filed by Robert E. Rankin on February 2, 1938, but differs therefrom in the arrangement of the mechanism for releasing the trough sections to telescopically move with respect to each other upon overload of the trough line or drive.

The principal object of my invention is to provide a new and improved means of a simple, novel, and efficient construction for releasing an overload condition from a shaker conveyer trough line or drive upon overload of either the drive or trough line.

My invention may be more clearly understood with reference to the accompanying drawings wherein:

Figure 1 is a plan view of the inby end of a shaker conveyer trough line with an overload releasing device constructed in accordance with my invention associated therewith adjacent a pickup member on the end of the trough line;

Figure 2 is a side elevation of the outby end of a shaker conveyer trough line with an overload releasing device constructed in accordance with my invention shown as being associated therewith adjacent the conveyer drive mechanism;

Figure 3 is an enlarged fragmentary plan view of the overload releasing device in a locked position, with parts of the trough sections and overload releasing device broken away and shown in horizontal section;

Figure 4 is a side elevation of the overload releasing device drawn to the same scale as Figure 3, looking from the right hand side of the trough line and showing parts of the overload releasing device in the same position as in Figure 3 and in substantially longitudinal section;

Figure 5 is a plan view of the overload releasing device with parts thereof broken away and shown in horizontal section, illustrating the overload releasing device in a released position;

Figure 6 is a side elevation of the overload releasing device looking from the left hand side of the trough line with the parts positioned as shown in Figure 5 and drawn to the same scale as Figure 5;

Figure 7 is an enlarged fragmentary horizontal sectional view taken through the connection of one of the toggle links of the overload releasing device to one of the trough sections to more clearly show the details thereof;

Figure 8 is a sectional view taken substantially along line 8—8 of Figure 1; and Figure 9 is a sectional view taken substantially along line 9—9 of Figure 1.

In the embodiment of my invention illustrated in the drawings, an overload release generally indicated by reference character 10 is shown in Figure 1 as being connected in a shaker conveyer trough line 11 adjacent the inby end of the conveyer, between two trough sections 12, 12 to protect said trough line upon overload thereof, as in cases where a pickup member 14 on the end thereof engages an obstruction. Another overload release 10 is shown in Figure 2 as being connected between two other trough sections 12, 12 of said trough line adjacent the outby end of the conveyer to protect a conveyer drive mechanism 13 and the trough line upon overload thereof. Said pickup member and drive mechanism are of a construction well known to those skilled in the art and are no portion of my present invention so will not herein be described in detail. If desired, other overload releasing may be placed in other positions in the trough line either to protect the trough line or drive or to permit one section of the trough line to be stopped while the other section continues to operate.

The overload release includes a trough section 16 connected to an end of one of the trough sections 12 by means of connecting bolts 17, 17 in a usual manner, and a trough section 18 nested within the trough section 16 and connected in the trough line to an adjacent end of another trough section 11 by means of connecting bolts 19, 19 in the same manner that the trough section 16 is connected to its associated trough section.

Means are provided on the outer sides of the trough sections 16 and 18 to guide and support them for telescopic movement with respect to each other, which include a pair of longitudinally extending cylindrical support members 20, 20 secured to and projecting laterally from opposite sides of the trough section 18 above the bottom thereof and adjacent one end thereof. Said cylindrical support members, as herein shown, are adapted to form a support for tubes or pipes 21, 21 slidably mounted therein and extending longitudinally of the trough sections 16 and 18. Said tubes are secured at their ends opposite said support members in laterally projecting longitudinally extending cylindrical portions 22, 22 of a bracket 22a, which is secured to the underside of and extends upwardly along the sides of the trough section 16 (see Figure 8).

A novel form of yieldable linkage connection is provided between the trough sections 16 and 18 to hold said trough sections for reciprocable movement as a unit or to permit said trough sections to telescopically move with respect to each other upon overload of the trough line. Said connection, as herein shown, includes a bell crank member 23 pivoted to a bracket 24 by means of a rocking pin 25. Said bracket extends along and is secured to the bottom of the trough section 16 adjacent the longitudinal center line thereof (see Figure 4).

The rocking pin 25, as herein shown, has a rocking portion 26 between the ends thereof formed in the shape of a sector of a circle and adapted to extend through an aperture 27 formed in the bell crank member 23 (see Figure 7). Said aperture is likewise shaped like a sector of a circle with a considerably longer arc than the portion 26. The apex of the rocking portion 26 of the pin 25 is adapted to engage the apex of the aperture 27 and sufficient clearance is provided between the sides of said portion and said aperture to permit said pin to rock within said aperture. Figure 7 shows a slight amount of clearance between the periphery of the arcute face of the rocking portion 26 of the pin 25 and the arcute face of the aperture 27 so that said bell crank member may freely pivot about its point of engagement with the apex of the rocking portion 26.

One lever arm 29 of the bell crank member 23 extends in a general longitudinal direction away from the bracket 24 and forms a toggle link of the linkage connection between the trough sections 16 and 18. A toggle link 30 is pivotally connected to the end of the arm 29 by means of a rocking pin 31 in the same manner that the bell crank member 23 is pivotally connected to the bracket 24. A rocking pin 33 is mounted in the opposite end of the toggle link 30. Said pin is formed in the same manner as the rocking pins 31 and 25 but has squared upper and lower ends 34, 34, which are adapted to engage notches 35, 35 formed in upper and lower furcations of a forked latching member 36 (see Figures 5 and 8). Said latching member is secured to the bottom of the trough section 18 and extends along the central portion thereof in a generally longitudinal direction towards the trough section 16 (see Figures 3 and 4). The squared ends 34, 34 of the pin 33 are adapted to engage the notches 35, 35 of the latching member 36 to lock the trough sections 16 and 18 together through the toggle links 30 and 29 for reciprocable movement as a unit (see Figure 3).

It may be seen with reference to Figure 3 that when the squared ends 34, 34 of the pin 33 engage the notches 35, 35 of the latching member 36 that the toggle links 30 and 29 are substantially in alignment with each other and that the axes about which the outer ends of said links pivot are in alignment with the longitudinal center line of the conveyer, but that the axis of connection of said links together is offset from the center line of the conveyer. Thus, pressure exerted on said links through the latching member 36 will tend to break the joint between said links and permit the squared ends 34, 34 of the pin 33 to be disengaged from the notches 35, 35, and thus permit the trough sections to telescopically move with respect to each other, as in Figure 5.

A yieldable link 37 is provided to hold the links 29 and 30 in substantially extended relation with respect to each other. Said link is so arranged that it will yield upon a predetermined load on the trough line and permit the joint between said links to break. Said yieldable link, as herein shown, includes a yoke 40 pivoted to a lever arm 39 of the bell crank member 23 and having a longitudinally extending rod 41 threaded therein. Said rod extends through a boss 43a of an elongated bifurcated member 43 and is provided with a forked portion 42 extending from its end opposite said yoke. Said forked portion is slidably mounted between the furcations of said elongated bifurcated member. A compression spring 44 encircles said rod and is interposed between the member 43 and said yoke. The member 43 is pivotally mounted beneath the trough section 16 on a pivotal pin 45 mounted at its opposite ends in a bracket 47. The bracket 47 is secured to and extends longitudinally along and depends from the underside of the trough section 16 (see Figures 5, 6, and 8). The forked portion 42 of the rod 41 is provided with a pair of elongated aligned slots 46, 46 in the furcations thereof, through which the pin 45 extends, for limiting slidable movement of the rod 41 and forked portion 42 with respect to the member 43. Thus, when pressure is exerted on the bell crank member 23 through the latching member 36 and toggle links 30 and 29, and this pressure reaches a value which will deflect the spring 44, then the rod 41 and forked portion 42 will tend to move linearly with respect to the member 43.

Suitable means are provided to hold the ends 34, 34 of the pin 33 out of engagement with the notches 35, 35 of the latching member 36 which, as herein shown, comprise an interlocking member 49 pivotally mounted on the pin 45 between the furcations of the member 42. A link 51 pivotally connected to one lever arm 50 of said interlocking member is pivotally connected at its opposite end to a projection 53 of the toggle link 30.

A spring link 55 pivotally connected to a laterally extending lever arm 54 of the interlocking member 49 and interposed between said lever arm and the outer end of the lever arm 39 of the bell crank 23 is provided to move said interlocking member and the link 30 to a disengaged position with respect to the latching member 36 upon breaking of the toggle joint and hold it in such a position. Said spring link, as herein shown, includes an eyebolt 56 pivotally connected to the lever arm 54 by a pin 57, extending through the eye thereof. The opposite end of said eyebolt slidably extends through a yoke 61 pivotally connected to the outer end of the lever arm 39. A nut 62, threaded on the end of said eyebolt, abuts the inner side of said yoke between the furcations thereof. A compression spring 63 encircles said eyebolt and abuts the yoke 61 at one of its ends and the flange of a flanged sleeve 59 at its opposite end. Adjustment of said spring is effected by means of a nut 60 abutting the outer end of said flanged sleeve. Said spring link thus tends to move the interlocking member 49 in a counterclockwise direction inwardly towards the center of the trough line so that a shouldered portion 64 of said interlocking member may engage a pin 65 secured at its ends to the forked portion 42 of the rod 41. A handle 66 projects from the end of said interlocking member to enable the apparatus to be manually reset when desired.

It will be seen from the foregoing that when the load on the trough line is sufficient to deflect the toggle mechanism comprising the links 30 and 29 against the compression spring 44, that the rod 41 and forked portion 42 will slidably move with respect to the member 43. Movement of said forked portion will cause movement of the pin 65, secured between the furcations thereof, to a position which will permit the lever arm 39 and compression spring 63 to move the interlocking member 49 in a counterclockwise direction and engage the shoulder 64 of said interlocking member with said pin. At the same time, pivotal movement of said interlocking member, effected by said lever arm and compression spring will also pivot the toggle link 30, by means of the link 51, about its axis of connection to the toggle link 29 in a direction to disengage the ends 34, 34 of the pin 33 from the notches 35, 35 of the latching member 36. Upon disengagement of said pin from said latching member, the trough sections 16 and 18 may freely reciprocate with respect to each other, thus relieving all overload conditions from the trough line. Engagement of the shoulder 64 with the pin 65 by means of the spring 63 serves to hold said toggle links in an unlocked position. When the overload conditions have been relieved and it is desired that the trough sections 16 and 18 again reciprocate as a unit, the hand lever 66 must be moved in a clockwise direction to disengage the shoulder 64 from the pin 65 and extend the toggle links 30 and 29 and engage the ends 34, 34 of the pin 33 with the notches 35, 35 of the latching member 36, to permit the trough section 16 to reciprocably drive the trough section 18 through said toggle links.

It should further be noted that the overload releasing device herein shown is operable in one direction only, and that if it be desired that it operate when the loads on the trough line or drive are in an opposite direction, as in cases where the rear of the trough line engages an obstruction, its position in the trough line may be reversed.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In an overload releasing device for shaker conveyers, a conveyer trough line, a yieldable connection between two trough sections in said trough line for permitting said trough sections to telescopically move with respect to each other upon overload of said trough line including a pair of toggle links a pivotal connection between one of said links and one of said trough sections, and a releasable connection between said other link and said other trough section.

2. In an overload releasing device for shaker conveyers, a conveyer trough line, a yieldable connection between two trough sections in said trough line for permitting said trough sections to telescopically move with respect to each other upon overload of said trough line including a pair of toggle links, a pivotal connection between one of said links and one of said trough sections, a releasable connection between said other link and said other trough section, and yieldable means reacting against one of said links for holding said links in substantially extended relation with respect to each other.

3. In an overload releasing device for shaker conveyers, a conveyer trough line, a yieldable connection between two trough sections in said trough line for permitting said trough sections to telescopically move with respect to each other upon overload of said trough line including a pair of toggle links, a pivotal connection between one of said links and one of said trough sections, a releasable connection between said other link and said other trough section, yieldable means reacting against one of said links for holding said links in substantially extended relation with respect to each other, and other yieldable means having connection with said other link for locking said links in a released position with respect to said trough sections.

4. In an overload releasing device for shaker conveyers, a conveyer trough line, a yieldable connection between two trough sections in said trough line for permitting said trough sections to telescopically move with respect to each other upon overload of said trough line including a pair of toggle links, a pivotal connection between one of said links and one of said trough sections, a releasable connection between said other link and said other trough section, yieldable means reacting against one of said links for holding said links in substantially extended relation with respect to each other, and other yieldable means having connection with said other link and cooperating with said first mentioned yieldable means for locking said links in a released position with respect to said trough sections including a locking member actuated by said second mentioned yieldable means and adapted to have locking engagement with said second mentioned locking means.

5. In an overload releasing device for shaker conveyers, a conveyer trough line, a yieldable connection between two trough sections in said trough line for permitting said trough sections to telescopically move with respect to each other upon overload of said trough line including a pair of toggle links, a pivotal connection between one of said links and one of said trough sections, a releasable connection between said other link and said other trough section, and a compression spring against which said link which is pivotally connected to its associated trough section is adapted to react, said spring engaging said link at a point offset from the axis of pivotal connection of said link to said trough section for holding said links in substantially extended relation with respect to each other and permitting the joint between said links to break upon a predetermined load on said spring.

6. In an overload releasing device for shaker conveyers, a conveyer trough line, a yieldable connection between two trough sections in said trough line for permitting said trough sections to telescopically move with respect to each other upon overload of said trough line including a pair of toggle links, a pivotal connection between one of said links and one of said trough sections, a releasable connection between said other link and said other trough section, and a compression spring against which said link which is pivotally connected to its associated trough section is adapted to react, said spring engaging said link at a point offset from the axis of pivotal connection of said link to said trough section for holding said links in substantially extended relation with respect to each other and permitting the joint between said links to break upon a predetermined load on said spring, and another compression spring having connection with said other link for holding said link in a released position with respect to its associated trough section until manually reset.

7. In an overload releasing device for a shaker conveyer trough line, a pair of nested trough sections connected in said trough line and a yieldable connection between said trough sections for permitting said trough sections to telescopically move with respect to each other upon overload of said trough line including a pair of toggle links arranged along the bottom of said trough sections, a pivotal connection between one of said links and one of said trough sections and a releasable connection between said other link and said other trough section, and means for yieldably holding said links in extended relation with respect to each other including an arm projecting from said first mentioned link and a yieldable member reacting against said arm for holding said links in substantially extended relation with respect to each other and permitting the joint between said links to break upon a predetermined load on said yieldable member.

8. In an overload releasing device for a shaker conveyer trough line, a yieldable connection between two trough sections in said trough line for permitting said trough sections to telescopically move with respect to each other upon overload of said trough line including a pair of toggle links, a pivotal connection between one of said links and one of said trough sections and a releasable connection between said other link and said other trough section, and means for yieldably holding said links in extended relation with respect to each other including an arm projecting from said first mentioned link, a yieldable member reacting against said arm and adapted to permit the joint between said links to break upon a predetermined load on said yieldable member, and another yieldable member having connection with said arm and with said other link for holding said other link in a released position with respect to its associated trough section until manually reset.

9. An overload releasing device for a shaker conveyer trough line including a pair of nested trough sections connected in said trough line and a yieldable connection between said trough sections for permitting said trough sections to telescopically move with respect to each other upon overload of said trough line, said yieldable connection including a pair of toggle links, a pivotal connection between one of said links and one of said trough sections and a releasable connection between said other link and said other trough section, and means for yieldably holding said lings in extended relation with respect to each other including an arm projecting from said first mentioned link, and a yieldable member reacting against said arm and adapted to permit the joint between said links to break upon a predetermined load on said yieldable member.

10. An overload releasing device for a shaker conveyer trough line including a pair of nested trough sections connected in said trough line and a yieldable connection between said trough sections for permitting said trough sections to telescopically move with respect to each other upon overload of said trough line, said yieldable connection including a pair of toggle links, a pivotal connection between one of said links and one of said trough sections, a releasable connection between said other link and said other trough section, and means for yieldably holding said links in extended relation with respect to each other including an arm projecting from said first mentioned link, a yieldable member reacting against said arm for holding said links in substantially extended relation with respect to each other and permitting the joint between said links to break upon a predetermined load on said yieldable member, said yieldable member including a member having yieldable slidable connection with the trough section to which said first mentioned link is pivotally connected, and a yieldable connection between said arm and said other link for holding said link in a released position with respect to its associated trough section until manually reset including a locking member adapted to have locking engagement with said first mentioned member, and a linkage connection between said other link and said locking member.

11. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank and having a releasable connection with said other trough section, and yieldable means having connection with the other lever arm of said bell crank for holding said link in an engaged position with its associated trough section, and permitting said link to be released therefrom upon a predetermined load thereon.

12. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank and having a releasable connection with said other trough section, and yieldable means having connection with the other lever arm of said bell crank for holding said link in an engaged position with respect to its associated trough section and permitting said link to be released therefrom upon a predetermined load thereon, and other yieldable means connected between said bell crank and link for locking said link in a released position with respect to its associated trough section.

13. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank and having a releasable connection with said other trough section, yieldable means having connection with the other lever arm of said bell crank for holding said link in an engaged position with its associated trough section, and permitting said link to be released therefrom upon a predetermined load thereon, and other yieldable means connected between said bell crank and link for locking said link in a released position with respect to its associated trough section including a locking member having pivotal connection with said trough section to which said bell crank is pivotally connected, a yieldable member connected between said locking member and bell crank, a connection between said locking member and link, and means on said first mentioned yieldable means adapted to be engaged by said locking member for holding said link in a released position.

14. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank at one of its ends, a pin mounted in the other end of said link for limited pivotal movement with respect thereto, a latching member having connection with said other trough section and adapted to be engaged by said pin, and yieldable means engaging the other lever arm of said bell crank and holding said pin in an engaged position with respect to said latching member and permitting said pin to be released from said latching member upon a predetermined load on said yieldable member.

15. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank, a pin mounted in the other end of said link for limited pivotal movement with respect thereto, a latching member having connection with said other trough section and adapted to be engaged by said pin, yieldable means having connection with the other lever arm of said bell crank for holding said pin in an engaged position with respect to said latching member and permitting said pin to be released therefrom upon a predetermined load on said yieldable means, and other yieldable means connected between said bell crank and link for locking said pin in a released position with respect to said latching member.

16. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank, a pin mounted in the other end of said link for limited pivotal movement with respect thereto, a latching member having connection with said other trough section and adapted to be engaged by said pin, and yieldable means having connection with the other lever arm of said bell crank for holding said pin in an engaged position with respect to said latching member and permitting said pin to be released therefrom upon a predetermined load on said yieldable means, and other yieldable means connected between said bell crank and link for locking said pin in a released position with respect to said latching member including a locking member having pivotal connection with said trough section to which said bell crank is pivotally connected, a yieldable member connected between said locking member and bell crank, a connection between said locking member and link, and means on said first mentioned yieldable means adapted to be engaged by said locking member for holding said pin in a released position with respect to said latching member.

17. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank, a pin mounted in the other end of said link for limited pivotal movement with respect thereto, a latching member having connection with said other trough section and adapted to be engaged by said pin, and yieldable means having connection with the other lever arm of said bell crank for holding said pin in an engaged position with respect to said latching member and permitting said pin to be released therefrom upon a predetermined load on said yieldable means, and other yieldable means cooperating with said first mentioned yieldable means and connected between said bell crank and link for locking said pin in a released position with respect to said latching member including a locking member having pivotal connection with said trough section to which said bell crank is pivotally connected, a yieldable member connected between said locking member and bell crank, a connection between said locking member and link, and means on said first mentioned yieldable means adapted to be engaged by said locking member for holding said pin in a released position with respect to said latching member.

18. In a shaker conveyer trough line, means interposed in said trough line for releasing loads from said trough line upon a predetermined load thereon including a pair of nested trough sections, means for holding said trough sections to move as a unit and releasing said trough sections to move telescopically with respect to each other upon a predetermined load on said trough line including a bell crank having pivotal connection with one of said trough sections, a link having pivotal connection with one lever arm of said bell crank, a pin mounted in the other end of said link for limited pivotal movement with respect thereto, a latching member having connection with said other trough section and adapted to be engaged by said pin, and yieldable means having connection with the other lever arm of said bell crank for holding said pin in an engaged position with respect to said latching member and permitting said pin to be released therefrom upon a predetermined load on said yieldable means, and other yieldable means connected between said bell crank and link for locking said pin in a released position with respect to said latching member including a locking member having pivotal connection with said trough section to which said bell crank is pivotally connected, a yieldable member connected between said locking member and bell crank, a connection between said locking member and link, said first mentioned yieldable means including a member mounted for yieldable movement with respect to its associated trough section, and means on said member adapted to be engaged by said locking member for holding said pin in a released position with respect to said latching member.

WILLIAM W. SLOANE.